US005542811A

United States Patent [19]

Vartanian

[11] Patent Number: 5,542,811

[45] Date of Patent: Aug. 6, 1996

[54] WHEELCHAIR LIFT WITH LATERALLY DISPLACEABLE SUPPORT POST FOR VERTICAL AND ROTATIONAL DISPLACEMENT

[76] Inventor: Roger Vartanian, P.O. Box 636, Broadheadsville, Pa. 18322

[21] Appl. No.: 368,416

[22] Filed: Jan. 4, 1995

[51] Int. Cl.[6] .......... B60P 1/44

[52] U.S. Cl. .......... 414/541; 414/921

[58] Field of Search .......... 414/539–541, 414/545, 921, 749

[56] References Cited

U.S. PATENT DOCUMENTS

| | | | |
|---|---|---|---|
| 3,182,826 | 5/1965 | Mutto | 414/541 |
| 3,737,009 | 6/1973 | Stoddard | 187/200 X |
| 4,124,096 | 11/1978 | Dudynskyj et al. | 414/539 |
| 4,124,097 | 11/1978 | Hawks et al. | 414/540 |
| 4,164,292 | 8/1979 | Karkau | 414/545 |
| 4,353,436 | 10/1982 | Rice et al. | 414/540 X |
| 4,441,850 | 4/1984 | Thorley | 414/545 |
| 4,466,771 | 8/1984 | Thorley et al. | 414/787 |
| 4,479,753 | 10/1984 | Thorley | 414/541 |
| 4,529,351 | 7/1985 | Olins | 414/545 |
| 4,541,511 | 9/1985 | Muller | 414/462 |
| 4,556,141 | 12/1985 | Faitel | 414/749 X |
| 4,606,433 | 8/1986 | Smalley et al. | 414/921 X |
| 4,664,584 | 5/1987 | Braun et al. | 414/541 |
| 4,685,860 | 8/1987 | McFarland | 414/921 X |
| 4,738,581 | 4/1988 | Kuhlman | 414/462 |
| 4,907,936 | 3/1990 | Bourdage | 414/545 |
| 4,966,516 | 10/1990 | Vartanian | 414/537 |
| 4,984,955 | 1/1991 | McCullough | 414/921 X |
| 5,040,638 | 8/1991 | Smith | 187/200 |
| 5,040,936 | 8/1991 | Rhea | 414/540 |
| 5,110,252 | 5/1992 | Aoki | 414/549 |
| 5,165,839 | 11/1992 | Aoki | 414/541 |
| 5,180,275 | 1/1993 | Czech et al. | 414/921 X |
| 5,242,257 | 9/1993 | Avakian | 414/462 |
| 5,284,414 | 2/1994 | Kempf | 414/545 |
| 5,308,214 | 5/1994 | Crain et al. | 414/921 X |
| 5,401,135 | 3/1995 | Stoen et al. | 414/921 X |

FOREIGN PATENT DOCUMENTS

| | | | |
|---|---|---|---|
| 26510 | 4/1981 | European Pat. Off. | 414/921 |
| 2617754 | 11/1977 | Germany | 414/921 |
| 221259 | 8/1993 | Japan | 414/921 |

*Primary Examiner*—David A. Bucci

*Attorney, Agent, or Firm*—Eckert Seamans Cherin & Mellott

[57] ABSTRACT

A wheelchair lift is mounted in a vehicle at one side of the doorway, for example at the front frame of a sliding side door of a van. A platform is positionable horizontally for carrying a wheelchair to be moved into or out of the vehicle. A vertical drive mechanism is attached to the platform at a corner adjacent the vehicle doorway, and has a hydraulic cylinder and chain drive raising and lowering the wheelchair relative to the doorway. A base member is attached to the vehicle inside the doorway, for example on the floor. A carriage is carried on the base member for linear movement toward and away from the doorway. The vertical drive mechanism is coupled to the carriage on a vertical hinge or pivot axis that is movable by a linear actuator from a position at which the hinge axis is inside the vehicle to a position outside of the vehicle clear of the doorway. The platform can be raised, lowered and rotated on the vertical pivot axis. Since linear movement rather than rotation clears the doorway, a wheelchair occupant can move on or off the platform from a number of angles of approach between parallel to the longitudinal axis of the vehicle and perpendicular thereto.

18 Claims, 7 Drawing Sheets

WHEELCHAIR LIFT WITH LATERALLY DISPLACEABLE SUPPORT POST FOR VERTICAL AND ROTATIONAL DISPLACEMENT

BACKGROUND OF THE INVENTION

1. Field of the Invention

The invention relates to the field of lifts for assisting wheelchair users in entering and exiting vehicles, for example through the sliding side door or rear door of a van. The invention provides a foldable platform lift, rotatably mounted on a vertical post, and including a drive means enabling vertical and rotational displacement of the platform on the post. According to the invention, the vertical post is displaceable laterally of the vehicle on a linear drive having a stroke sufficient to position the vertical post clear of the doorway, for clearance to lower and rotate the platform. The combination of vertical and lateral horizontal movement with pivoting on the vertical post provides a compact arrangement that does not limit the user's ability to enter and exit the platform to any particular angle relative to the longitudinal axis of the vehicle.

2. Prior Art

According to U.S. Pat. No. 4,664,584—Braun et al, a wheelchair lift for a van is provided with a horizontal platform mounted at one corner to the lower end of a telescoping vertical drive post carrying a hydraulic actuator for moving the horizontal platform vertically up and down between the ground and the level of the floor of the passenger compartment. The apparatus is mounted to the floor of the van inside a sliding side door. The movable parts of the lift, namely the platform and the vertical drive post, hinge around a fixed vertical pivot post that is rigidly mounted just inside the van at the edge of the doorway. The wheelchair is rolled onto the platform inside the van; the platform is rotated outwardly on the fixed pivot post; the platform is lowered to the ground; and the wheelchair is rolled off.

The lift must be mounted such that it can be moved completely inside the vehicle, allowing the door to be closed. The vertically displaceable parts likewise must be movable completely outside, for clearance to lower the platform. In Braun, the telescoping vertical drive post is spaced radially from the fixed pivot post. Therefore, when the platform and vertical drive post are rotated around the fixed pivot axis, they move in an arc through the vehicle doorway. In this manner, the platform can be moved in and out of the van and when the platform is outside of the van, the vertical drive post is clear of the doorway for lowering the platform.

The platform and vertical drive can hinge or pivot through 90°. The platform remains horizontal. When the platform is inside the van, the user moves on or off the platform in a direction perpendicular to the longitudinal axis of the vehicle. When the platform is outside the van the user moves on or off the platform in a direction parallel to the longitudinal axis of the vehicle. This arrangement is effective for moving the vertically displaceable parts of the lift through the van doorway in either direction, with clearance when outside. However, since hinging around the fixed vertical pivot is the aspect that moves the platform through the doorway of the van, there is no choice for the angle of the platform when outside and lowered. The platform cannot be hinged to another angle when lowered, due to interference with the vehicle. In addition, the platform takes up a good deal of space in the van, requiring persons without wheelchairs to climb over the platform to use the doorway.

A different form of van mounted wheelchair lift is disclosed, for example, in U.S. Pat. No. 4,353,436—Rice et al. According to this arrangement, a linearly displaceable track and roller arrangement moves two vertically telescoping drive posts on opposite sides of the vehicle doorway, into the van or out of the van. When the drive posts are clear of the doorway, the platform can be lowered. In this case the user must move onto and off of the platform in a direction perpendicular to the longitudinal axis of the vehicle. Again, there is no choice of access angle.

It is also the case with ramp structures that the access angle is fixed, for example as in U.S. Pat. No. 4.966,516—Vartanian. Typically the ramp is directed perpendicular to the doorway, or laterally of the vehicle for the side door. According to Vartanian '516, the ramp can have alternative pivots so that at least when stowed away, the ramp does not interfere with passage through the doorway.

A lift generally occupies less space than a ramp when deployed. When embarking or disembarking a vehicle, it may be desirable at times to move parallel to the vehicle axis, perpendicular to the axis or at some other angle. For example, to move onto or off of a lift or ramp between parked cars or at a driveway, perpendicular to the vehicle axis is the preferred direction. If the van is alongside another vehicle, for example when in a parking lot or when double parked parallel to the vehicle axis is preferred. In other situations, such as near obstructions or when the doorway opens into a traffic lane or if the ground is sloped, some other angle may be more direct or even may be required to provide sufficient space to maneuver the wheelchair.

It would be advantageous to provide a wheelchair lift structure that has all the advantages of the foregoing cited patents, without the drawbacks of their respective structures. It would be particularly advantageous to provide a compact wheelchair lift that does not use a great deal of interior space or obstruct the doorway, that enables some choice of access angle, and that is durable and versatile.

SUMMARY OF THE INVENTION

It is an object of the invention to provide a hinging and vertically movable wheelchair lift wherein a vertical pivoting support is laterally displaceable outwardly from a vehicle doorway at which the lift is mounted, for clearing the doorway while permitting pivoting to a range of alignments relative to the vehicle.

It is another object of the invention to provide actuators for moving a pivoting portion of a wheelchair lift mechanism clear of a vehicle doorway, for raising and lowering the lift, and for rotating the lift relative to a displaceable hinging axis.

It is also an object of the invention to provide a vehicle wheelchair lift that is compact and only minimally takes up useful space in the vehicle, particularly across the doorway at which the lift is mounted.

It is another object of the invention to provide a lift as described, with means for locking and unlocking the platform part of the lift in an upright position for stowing or in a horizontal position for deployment.

These and other objects are accomplished by a wheelchair lift mounted in a vehicle at one side of a doorway, for example at the front or rear frame member of a sliding side door of a van, or at one of the frame members of a rear door.

A platform is positionable horizontally for carrying a wheelchair to be moved into or out of the vehicle. A vertical drive mechanism is attached to the platform at a corner adjacent the vehicle doorway, and has a hydraulic cylinder and chain drive raising and lowering the wheelchair relative to the doorway. A base member is attached to the vehicle inside the doorway, for example on the floor. A carriage is carried on the base member for linear movement toward and away from the doorway. The vertical drive mechanism is coupled to the carriage on a vertical hinge or pivot axis that is movable by a linear actuator from a position at which the hinge axis is inside the vehicle to a position outside of the vehicle clear of the doorway. The platform can be raised, lowered and rotated on the vertical pivot axis.

An additional linear actuator, coupled between the carriage and one of the vertical drive mechanism and the platform, controls hinging of the platform around the vertical pivot axis. Since linear movement of the carriage rather than rotation around the vertical axis moves the lift clear of the doorway, a wheelchair occupant can move on or off the platform from a number of angles of approach between parallel to the longitudinal axis of the vehicle and perpendicular thereto.

The platform also can be raised around a horizontal hinge axis, into a stowed vertical position, and in that position can be rotated around the vertical pivot axis to clear the vehicle doorway for normal access without climbing over the platform. This horizontal axis is provided by a hinge joint between the platform and the vertical drive mechanism adjacent a bottom thereof. A first latch is disposed on the vertical drive mechanism above the horizontal axis and allows the platform to be locked in the stowed vertical position. A second latch is mounted between a frame member attached to the additional linear actuator that drives rotation on the vertical axis. Disengaging the second latch permits free manual pivoting of the platform on the vertical axis, especially when locked in the raised position by the first latch.

According to one aspect of the invention, the carriage is carried on the base member via a bushing slidable on a cylindrical slide bar. A roller spaced radially from the bushing bears between the carriage and the base member and is adjustable to set the vertical alignment of the lift.

The linear drives for displacing the vertical pivot axis through the doorway (e.g., laterally of the vehicle) and for rotating the platform around the vertical axis, can have electric motors reversibly driving respective threads. The vertical drive mechanism preferably includes a hydraulic cylinder coupleable to a hydraulic pump, which also can be driven by an electric motor. A manual operator for the pump, and means for disengaging the motors of the actuators, allow the lift to be deployed and/or stowed in the absence of electrical power.

At least one gate member, and preferably two opposite gate members, are disposed along the edge of the platform and raise or lower to prevent a wheelchair from moving off the platform except when resting on a horizontal surface. For example, an interior gate is operated by contact with the floor of the vehicle, and an exterior gate, or both opposite gates, are operated by contact with the ground. The gates have spring biased latches operable to keep the respective gate members raised when the platform is not in contact with a horizontal surface, and opened by contact with the horizontal surface.

The gate latches are spring biased to close, but are more positively held shut by a pin and slot arrangement when the gates are raised, to prevent opening against the spring force caused by a force parallel to the plane of the platform, e.g. , which could result from a wheelchair rolling against the gate. The gate latches have paired pivoting elements, one of which moves with the gate and the other of which blocks the gate when raised. A pin in one of the pivoting members rests in a substantially L-shaped slot in the other of the pivoting members. When the gate is fully raised the pin rests in the bottom of the L-shape, out of line with the longer part of the L-shape, which is aligned in a direction that would allow the gate to open. As the platform contacts a surface, the pin and slot arrangement disengage to allow the gate to open.

A number of additional aspects of the invention will be apparent from the following discussion of particular embodiments.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
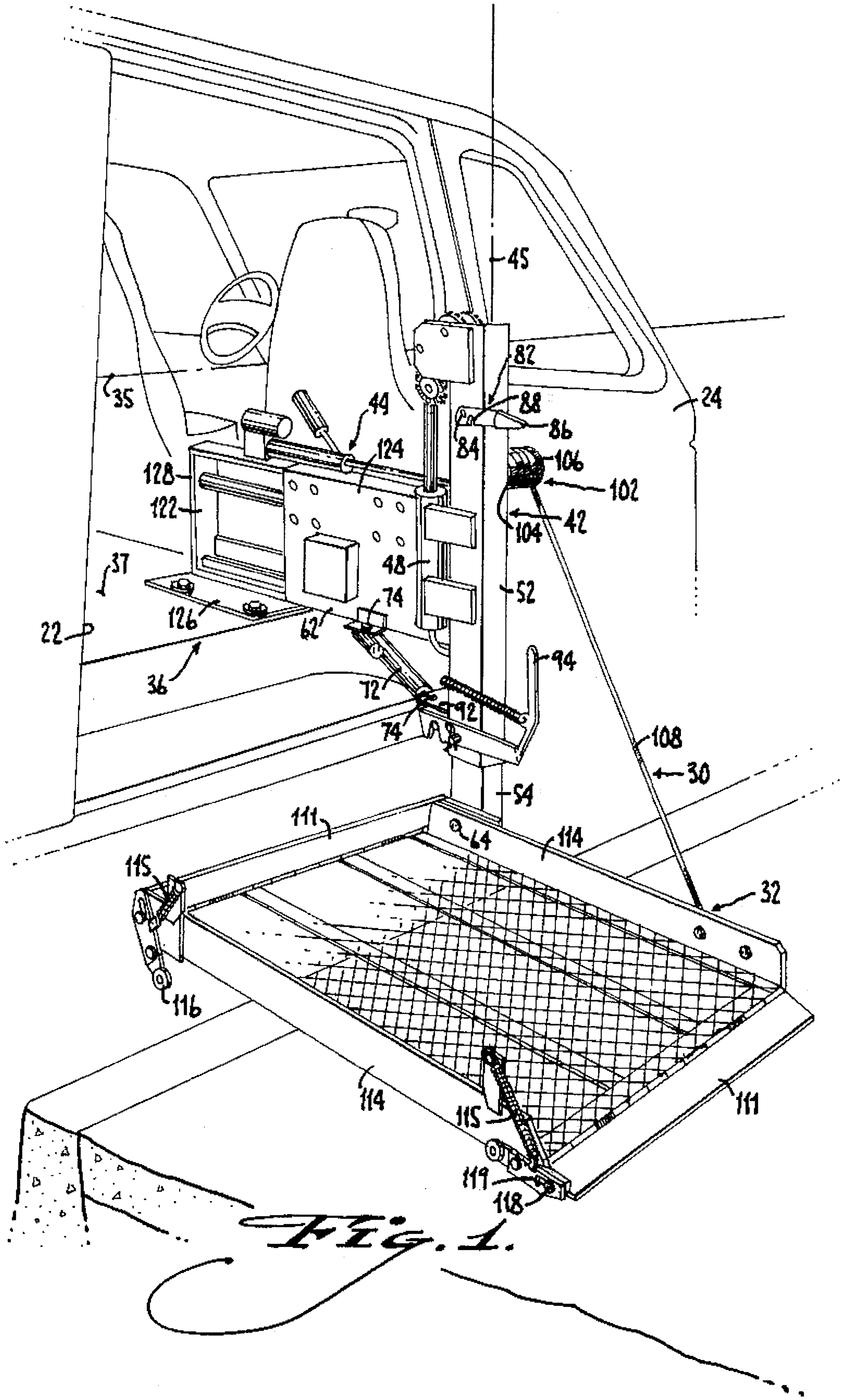
FIG. 1 is a perspective view showing a sliding side door of a van, with the lift of the invention shown in a lowered position.

FIG. 1 shows the sliding side door 22 of a van 24, with the lift 30 of the invention in its lowered position as needed for a wheelchair (not shown) to be rolled on or off the platform 32 of the lift, in a direction perpendicular to the longitudinal axis 35 of van 24. The invention is also applicable to other types of doors and vehicles, for example a pivoting door, a rear door, etc.

Lift 30 has a base 36 rigidly attached to vehicle 24 inside door 22, for example base 36 being bolted to the floor 37 of the passenger compartment adjacent the doorway. When lift 30 is deployed, the platform 32 and the vertical drive mechanism 42 coupled between platform 32 and base 36 are moved laterally of vehicle 24 to protrude through the doorway. This lateral movement is guided by a linear drive means 44 and provides clearance to move the wheelchair-supporting platform 32 vertically upwardly and downwardly. In addition, platform 32 and vertical drive mechanism 42 are hinged on a vertical axis 45 adjacent to vertical drive mechanism 42, permitting platform 32 to be oriented anywhere in a range of angles between perpendicular to the longitudinal axis 35 of vehicle 24 and parallel thereto.

The vertical drive mechanism 42 is attached to platform 32 and has powered means 48 for raising and lowering platform 32 and a wheelchair or similar load (not shown) relative to the doorway and the ground. The vertical drive mechanism as shown includes two telescoping members 52, 54, a distal one 54 being attached rigidly to platform 32 and a proximal one 52 being attached rotatably on vertical pivot axis 45 to the carriage portion 62 of base 36. Carriage portion 62 is linearly displaceable on base 36 to move vertical drive mechanism 42 and platform 32 into a position clear of the doorway for deployment, and into a position in-board of the doorway such that the vehicle door can be closed with lift mechanism 30 disposed entirely inside. Thus, platform 32 can be raised, lowered and hinged on vertical pivot axis 45, for access to platform 32 over a range of rotational positions of the platform.

Figure 2:
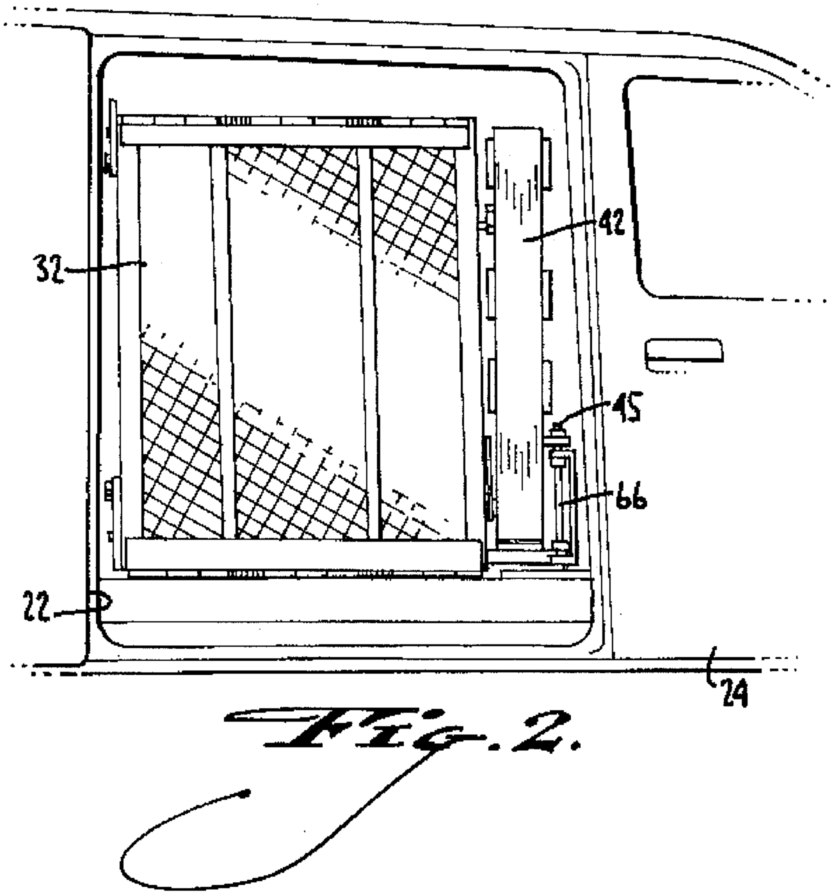
FIG. 2 is a side elevation view into the doorway, showing the lift of the invention as stowed.
Figure 3:
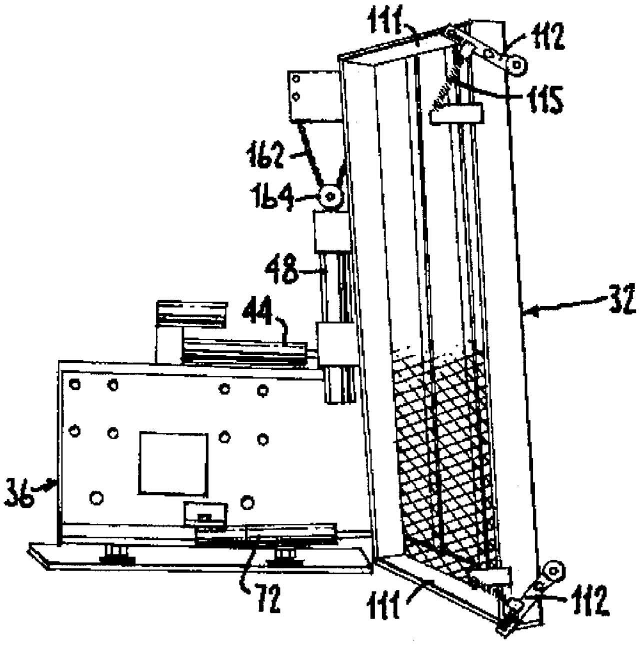
FIG. 3 is a perspective view of the lift mechanism only, as seen from the left inside the van.
Figure 4:
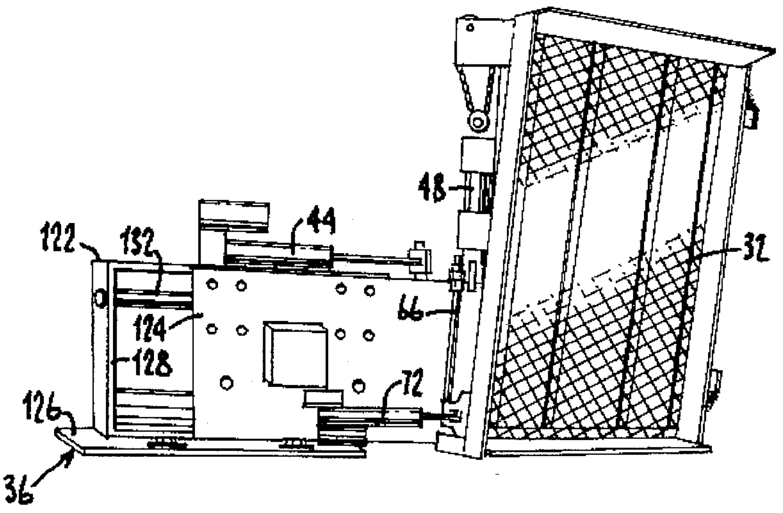
FIG. 4 is a perspective view corresponding to FIG. 3, with the platform folded up and the linear actuators advanced to their extreme outward and rotated positions.

Referring to FIGS. 1–3, platform 32 is also pivotable on a horizontal hinge 64 relative to lower telescoping member 54 of vertical drive mechanism 42. Platform 32 can be rotated up into a vertical plane around the axis of hinge 64, and positioned across the doorway as shown in FIG. 2. In this position, platform 32 occupies minimal space inside the vehicle; however it blocks access through the doorway. The vertical hinge 66 coupling between movable carriage 124 of base 36 and proximal telescoping member 52 of vertical drive means 42 allows platform 32 to be rotated to clear the doorway for access, as shown in FIG. 4.

Preferably, hinging on vertical pivot axis 45 is driven in opposite directions by an additional linear drive means 72, coupled between carriage 62 of base 36 and proximal telescoping member 52 of vertical drive means 42. The points 74 of attachment of this additional linear drive means 72 are spaced from vertical pivot axis 45. Therefore, extending or retracting drive means 72 results in rotation of vertical drive means 42 and platform 32 thereon, around vertical hinging axis 45.

FIGS. 2 and 3 show the invention as fully stowed, i.e., with platform 32 rotated up and across the doorway, and with linear drive 44 retracted to draw the entire unit inside vehicle 24. A latch mechanism 82 is provided on proximal telescoping vertical drive member 52, and is positioned to engage with a bolt or stud (not shown) on the side of platform 32, when vertical drive 42 is fully retracted and platform 32 is rotated up as in FIGS. 2–4. The latch 82 can comprise a simple hook type latch lever that pivots on a bolt 84 attached to proximal vertical drive member 52. Preferably the latch lever has an inclined surface 86 to lift it from a horizontal latching position, and a receptacle notch 88 that engages over the bolt or stud on platform 32 when the platform is pivoted up. The latch 82 is spaced from the horizontal hinge 64 of platform 32, preferably being disposed near the top of proximal vertical drive member 52.

As discussed above, the additional linear drive 72 is operable to drive rotation around vertical pivot 45, for example as shown in FIG. 3, where both linear drives 44, 72 are fully retracted. In the stowed position of lift 30, it is convenient to provide means to disengage the rotational linear drive 72 so that the folded up platform can swing freely like a gate on vertical pivot 45. This can be accomplished by providing an additional latch 92 on the proximal vertical drive member 52, operable to fix the end of the rotational linear drive 72 at a point spaced from vertical pivot axis 45, or to release the end entirely, whereupon the vertical drive 42 and platform 32 are free to swing to a position clear of the doorway.

Figure 17:
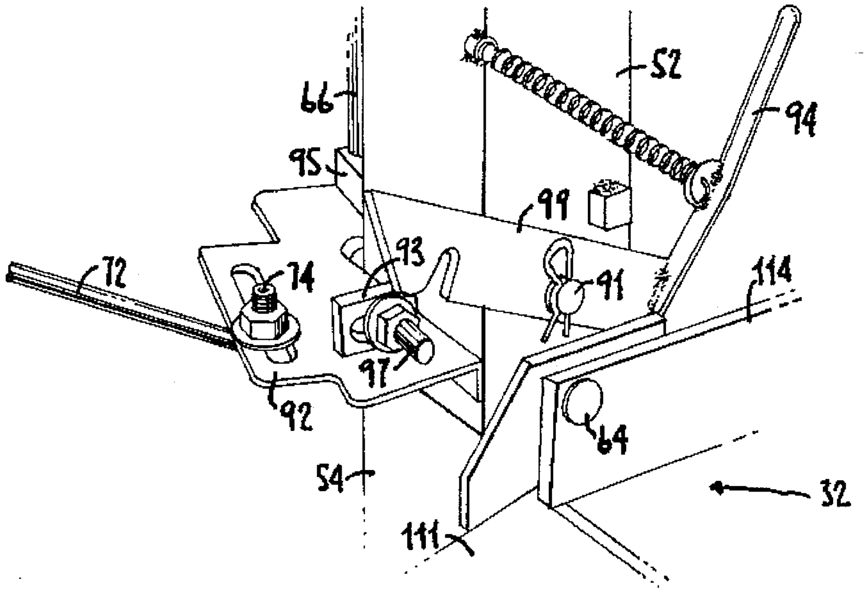
FIG. 17 is a detail perspective view showing the latch mechanism for engaging and disengaging the rotational drive.

FIG. 17 shows the additional latch 92 in detail. Latch member 99 rotates on pin 91 and is biased into the latching position by a spring attached to handle 94, the handle comprising an elongated lever for ease of use. Pulling on handle 94 lifts latch member 99 from a pin 97, that is adjustably mounted on an intermediate member 93. Member 93 is pivoted on the vertical pivot shaft 66 via a collar 95, and is attached to the rotational drive mechanism 72, at a slot allowing for adjustment. When latch member 99 is lifted, platform 114 can be rotated manually on shaft 66, free of the influence of rotational drive 72. Normally, when latch 94 is operated, intermediate member 93 is substantially parallel to the plane of the vehicle doorway, but latch 92 can be engaged or disengaged at other angles if desired.

Latch 92 is re-engaged by manually rotating platform 114 back against intermediate member 93, which can have a flange on the front as shown. As platform 114 is moved to abut vertical member 52 against member 93, latch member 99 is lifted via its inclined front edge and drops over latch pin 97 by spring pressure, thereby rotationally engaging the platform to drive 72 via member 93. Latch pin 97 can also be mounted in a slotted hole to enable precise adjustment of its position and to minimize mechanical play.

Figure 5:
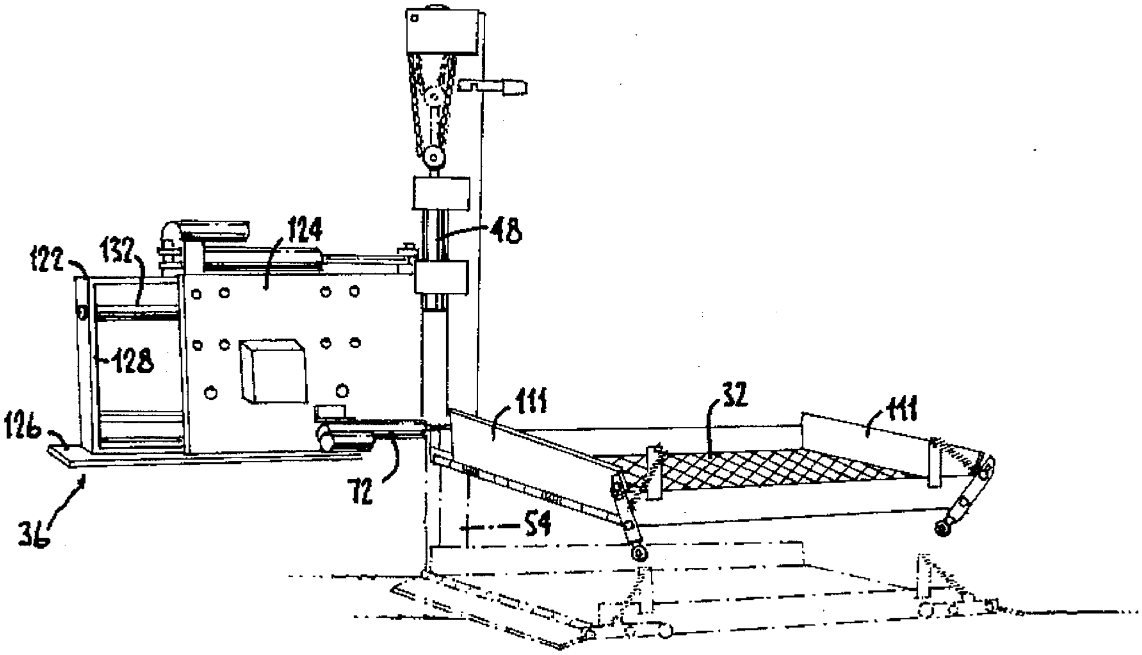
FIG. 5 is a perspective view showing the platform deployed and movable between its raised and lowered positions.

Pivoting of platform 32 on its horizontal hinge 64 can be difficult to control by a person within vehicle 24, particularly a person in a wheelchair. For fully automatic operation, a motorized winch arrangement 102 can be employed to draw platform 32 upwardly or to allow it to pivot downwardly by gravity. For example as shown in FIG. 5, winch 102 can include a motor 104 on proximal vertical drive member 52 with a spool 106 for winding or unwinding a chain or cable 108 coupled to platform 32. Alternatively, where a person is available for assistance from outside vehicle 24, platform 32 can be raised and lowered by manually pivoting it on horizontal hinge 64, and locked by latch 82 in the vertical position.

As an alternative to a winch, a gas cylinder (not shown) can be coupled between the lower member of the vertical drive mechanism and the platform, at a space from the horizontal pivot axis. The gas cylinder absorbs the energy of the platform when the platform is rotated downwardly, preventing it from crashing down when released by latch 82. Preferably, the gas cylinder is preloaded somewhat to urge the platform to rotate outwardly (i.e., down) when in the up position and locked by latch 82. Preloading the platform in this manner means that it must be pressed inwardly against pressure from the gas cylinder in order to engage with latch 82; however, the pressure is such that the platform cannot vibrate or rattle latch 82, which could cause latch 82 to disengage as the vehicle passes over a bumpy road. In addition, the up position of the platform is preferably slightly inward of precisely vertical, which further aids in the stability of the platform when stowed due to the inward leaning weight, and improves the integrity of its latching.

FIG. 5 illustrates operation of the two opposite end gates 111 on platform 32, which keep a wheelchair from rolling off platform 32 when the platform is not disposed against a horizontal surface such as the ground. Each of the gates 111 comprises a horizontally pivoted barrier or gate 111 coupled to one end of a pivoting contact arm 112 mounted on a side wall 114 of platform 32. Each contact arm 112 is biased by a respective spring 115 to pull the barrier 111 into a blocking position. Contact arm 112 has an end 116 opposite from the end attached to barrier 111, for example with a roller or the like, that extends below platform 32 when the barrier is raised as shown in solid lines in FIG. 5. When platform 32 contacts the ground (broken lines in FIG. 5), contact arm 112 is pivoted to draw barrier 111 down against the ground so that the wheelchair can be rolled onto or off of platform 32.

Figure 14:
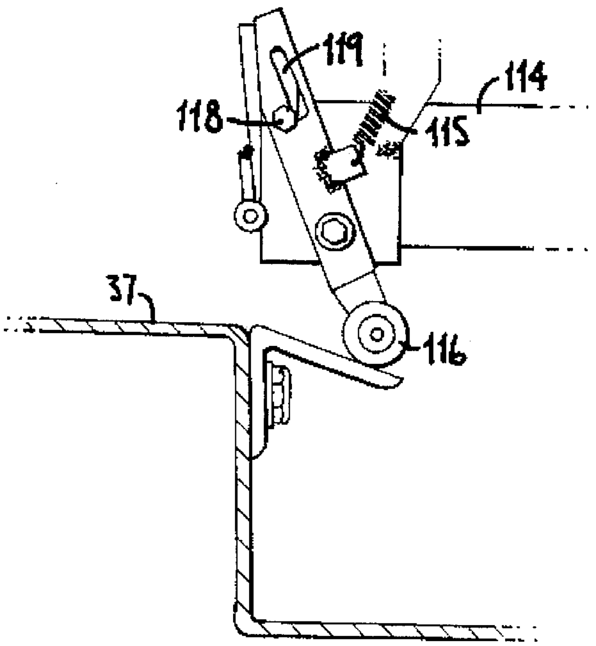
FIG. 14 is a partial section view showing the stepwell area of a vehicle equipped according to the invention.
Figure 15:
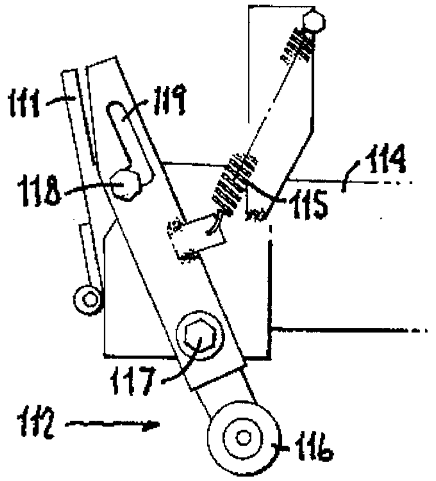
FIG. 15 is a detail elevation view showing the gate mechanism closed.
Figure 16:
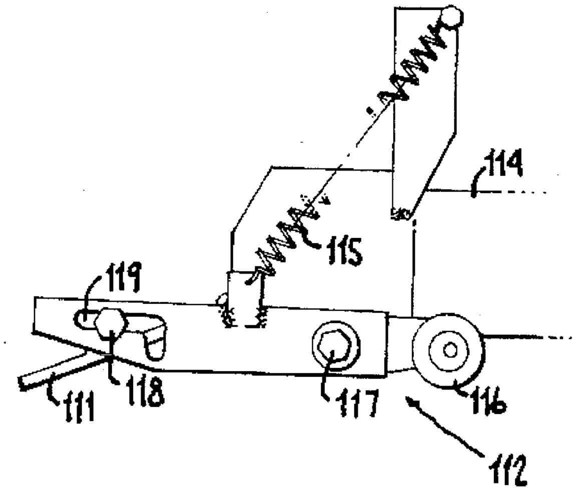
FIG. 16 is a detail elevation view corresponding to FIG. 15 and showing the gate mechanism opened.

In addition to spring bias for holding barrier 111 closed, contact arms 112 can have guide pins 118 that operate to lock the barriers in the raised position positively, when platform 32 is off the ground. For this purpose, an L-shaped slot 119 can be provided in contact arm 112, receiving a guide pin 118 on barrier 111. This arrangement is illustrated in FIGS. 14–16 , for the barrier on the inboard side, which contacts the floor of the vehicle adjacent the stepwell (if any) or at a short lip that can be affixed to the stepwell for smoother operation of the inboard gate. The lip can be an angle iron that is adjustable vertically via bolts and has a short curve that picks up the roller on the contact arms as the platform is moved inwardly.

As also shown in enlarged views in FIGS. 15 and 16, the L-shaped slot 119 in the contact arm receives guide pin 118, attached to the gate member. When the barrier is raised fully, pin 118 resides in the diverted end of the L-shaped slot, which end is roughly on a tangent relative to contact arm pivot bolt 117. Bolt 117 is spaced from the hinging axis of the gate, such that if the wheelchair rolls against the gate when raised, this end of slot 119 blocks the gate from hinging. Thus slot 119 provides a more positive gate closure than spring 115. Slot 119 can form a slight hook at the corner of its L-shape to enhance this locking aspect.

As shown in FIG. 15, when the gate is raised and contact arm 112 is not in contact with a surface, the end of slot 119 is oriented substantially perpendicular to the direction in which the barrier (and pin 118) need to move in order to open (i.e., perpendicular to a tangent to the gate hinging axis). Therefore, barrier 111 cannot be forced down against its spring bias by rolling the wheelchair against the barrier. As contact arm 112 reaches the ground and rotates around pivot bolt 117, slot 119 is displaced such that guide pin 118 is disposed in the other leg of L-shaped slot 119. As the contact arm rotates further, barrier 111 is caused to open by pressure against the guide pin from the contact arm, and pin 118 moves further along the slot to the open position shown in FIG. 16.

The barrier on the inboard side can be opened by contact with the floor of the vehicle passenger compartment or preferably by the lip at the edge of the stepwell. Both gates open when the platform is on the ground, or if the platform is lowered onto a curb, only the outer gate opens, etc.

Figure 6:
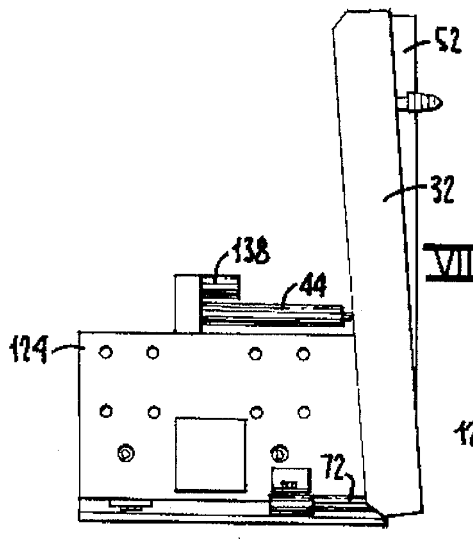
FIG. 6 is an elevation view corresponding to FIG. 3, with the lift fully retracted and stowed.
Figure 7:
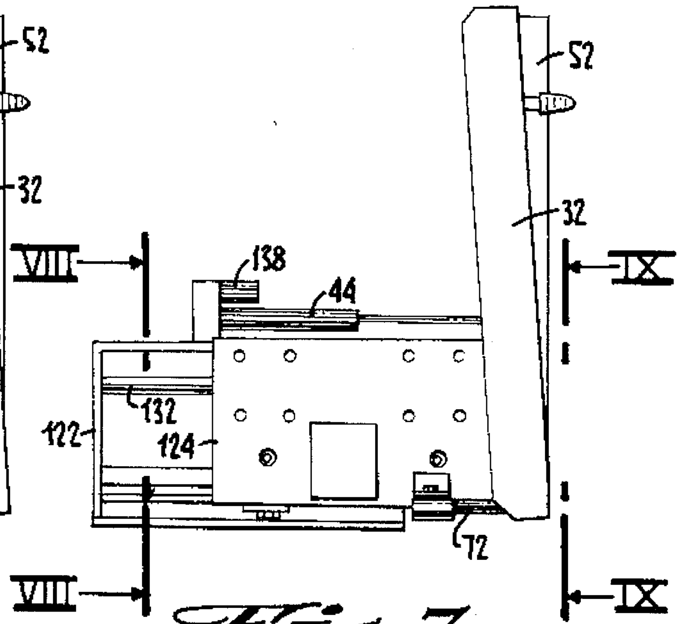
FIG. 7 is an elevation view as in FIG. 6, with the lift advanced to move the vertical pivot axis clear of the doorway.
Figure 8:
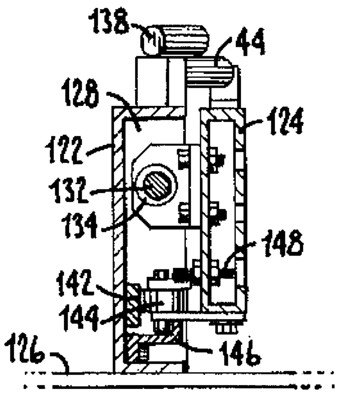
FIG. 8 is a section view taken along lines VIII—VIII in FIG. 7.
Figure 9:
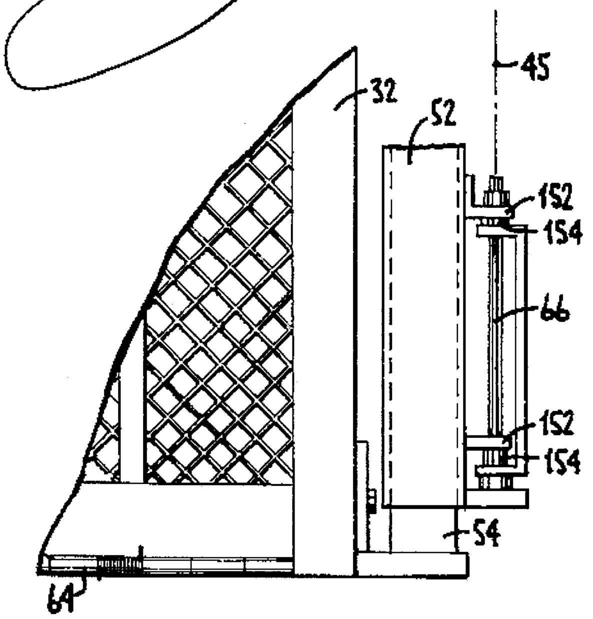
FIG. 9 is a partial elevation view taken along line IX—IX in FIG. 7.

FIGS. 6–8 show the base 36 and carriage 62 in more detail, and FIG. 9 shows the structure of the vertical pivot 45 between the vertical drive members 52, 54 and carriage 62. The base and carriage arrangement comprises a first box structure 122 closed on five sides and including a bottom plate 126 that is bolted to the vehicle floor and rigidly connected to end members 128 that support a stationary cylindrical bar 132. The movable carriage part 62 comprises a second box structure 124 as shown in FIG. 8, with at least one rigidly attached slide bushing 134 supported slidably on cylindrical bar 132. Preferably, two slide bushings 134 are provided, the bushing on the outboard side being spaced from platform 32 and vertical drive means 42 by a sufficient distance to provide the necessary travel (e.g., 8 to 12 inches or 20 to 30 cm) for moving vertical drive means 42 clear of the doorway when in the fully retracted position (FIG. 6) and the fully extended position (FIG. 7). With two slide bushings on bar 132, a vertical center support (not shown) can be provided to resist any tendency of bar 132 to become bowed.

The powered means for driving the linear displacement can be a 150–200 lb. (70–90 kg) linear actuator having a threaded screw and nut arrangement operated by an electric gearmotor 138. Preferably, the actuator is of a type that can be disengaged, such that upon loss of electric power carriage 62 can be retracted manually. Actuators of this type are available, for example, from Warner Electric Co.

The rotation-driving linear actuator 72 can be of the same type, being mounted between box structure 124 of carriage 62 and upper telescoping part 52 of vertical drive 42, between pivot points 74. However, as discussed above, the pivot point on the vertical drive side is preferably disengageable for swinging platform 32 manually, particularly when folded up.

The cylindrical slide bar 132 is disposed above a wear track 142 in the stationary box structure 122 of base 62. A roller 144 is attached to movable box structure 124 and bears against wear track 142. The weight of the movable parts of the lift is cantilevered on cylindrical bar 132, tending to urge the movable part of the apparatus clockwise in FIG. 8 around bar 132. However, roller 144 supports the movable box structure 124 relative to the fixed box structure 122. An outside flange 146 is provided in fixed box 122 for limiting wobble of the lift. The precise distance of roller 144 from movable box 124 is preferably threadably adjustable by a bolt 148, for setting the vertical pivot axis 45 precisely to vertical when the vehicle is on level ground.

FIG. 9 shows the hinge means defining vertical pivot 45 between movable carriage 124 and vertical drive means 42. It is an aspect of the invention that the rotation of the vertical drive means is not the motion that moves the lift clear of the vehicle door, this being accomplished by linear displacement of vertical pivot 45. Accordingly, vertical drive means 42 is located immediately adjacent to the hinge pin coupled to movable carriage box 124, being connected thereto by spaced flanges 152 and bearings 154 on proximal telescoping member 52 of vertical drive means 42. Platform 32 is coupled to the distal telescoping member 54 of vertical drive means 42.

Figure 11A:
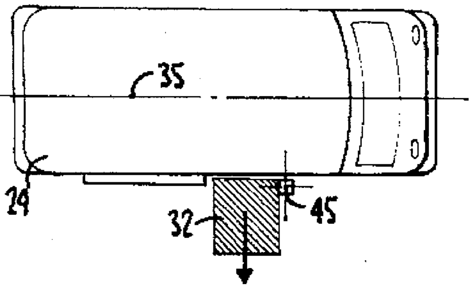
FIGS. 11*a*–11*c* respectively illustrate positioning of the lift for embarkation perpendicular to the vehicle axis and oblique thereto, in plan view.
Figure 11B:
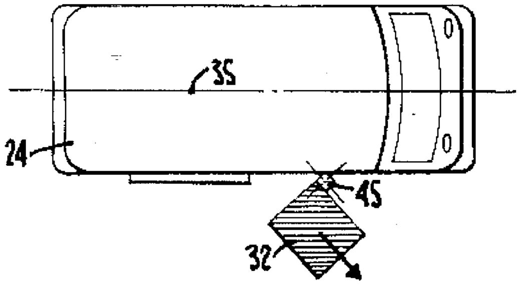
Figure 10:
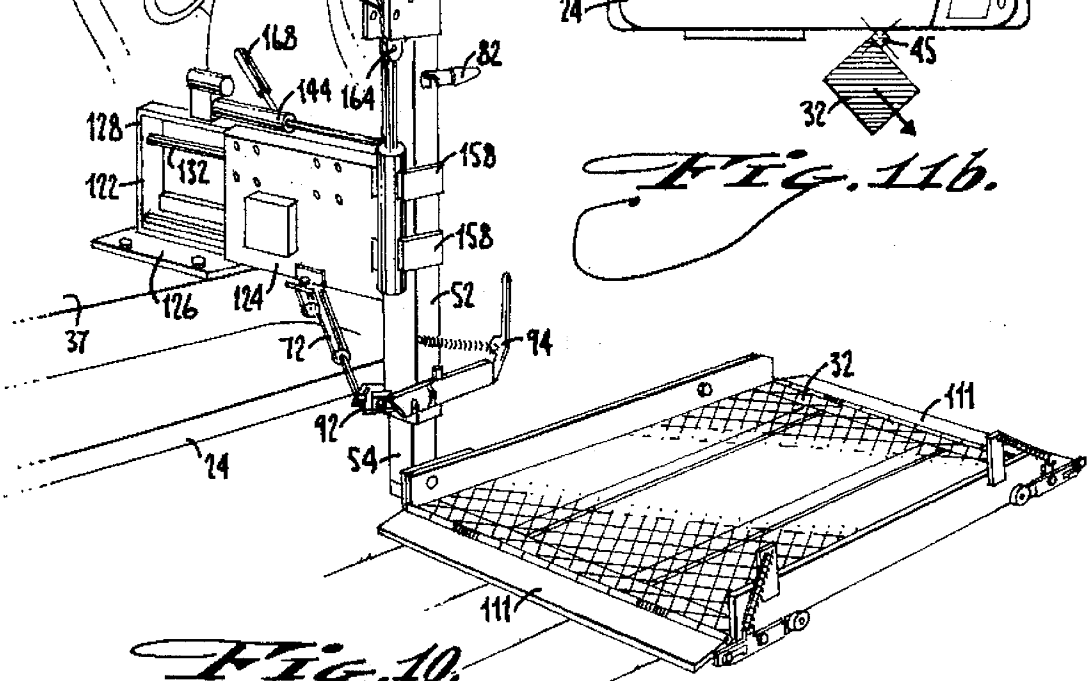
FIG. 10 is a partial elevation view showing the lift deployed for embarkation of a wheelchair in a direction parallel to the longitudinal axis of the van.
Figure 12:
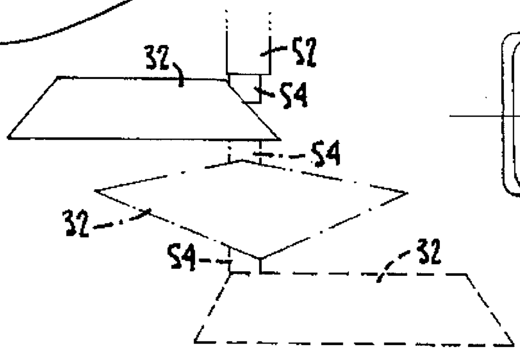
FIG. 12 illustrates positioning of the lift in perspective.
Figure 11C:
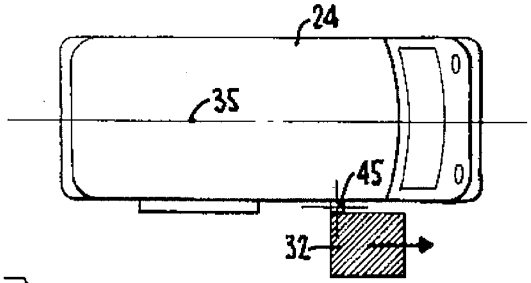
Figure 13:
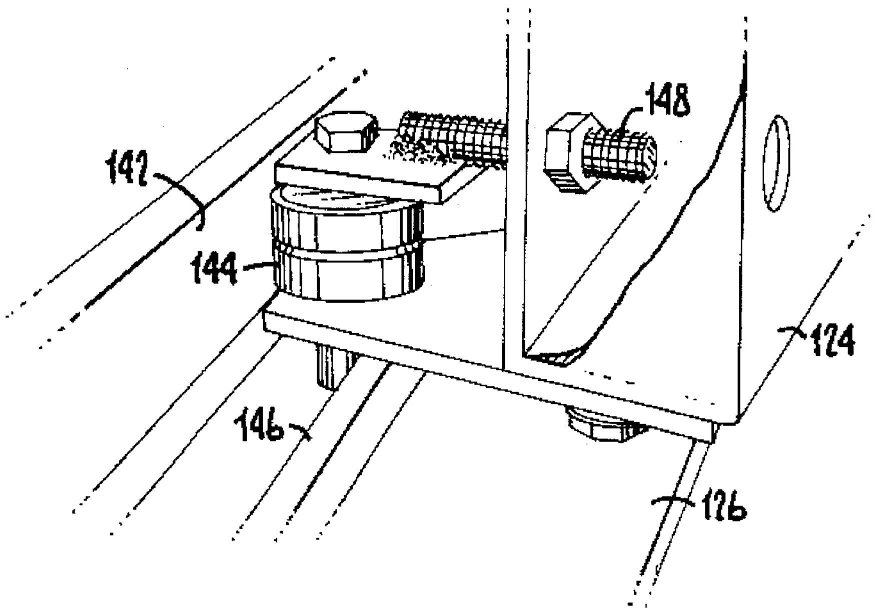
FIG. 13 is a partly sectional view showing the adjustment and roller means in the carriage and base of the lift.

FIGS. 10–12 demonstrate how the linear and rotational displacements provide a range of paths along which a wheelchair can approach or depart lift 30. In FIGS. 10 and 11*c*, the extended and lowered platform is rotated forward by 90°, such that the wheelchair moves alongside vehicle 24, parallel to longitudinal axis 35 of the vehicle (because the lift is mounted in a side door rather than a rear door). This position is appropriate for embarkation when the vehicle is parked along a building, double parked, etc. In FIG. 11*a*, platform 32 has been extended and lowered without rotation, for embarkation perpendicular to the vehicle axis, e.g., onto a sidewalk leading perpendicularly up to a curb. Platform 32 can be rotated to intermediate angles as in FIGS. 11*b* and 12, for other situations.

Of course the lift according to the invention can be mounted at the left or right doorway frame member, in mirror image. The lift also can be mounted to a rear door rather than a side door. The invention is also applicable to swinging or sliding doors and similar such applications, and is illustrated simply for one possible mounting as preferred for a side sliding door on a US type, left-side-drive, keep-right vehicle.

The embodiment shown is only provided with a span of forward rotation (or counterclockwise as shown) from its position inside the vehicle in the plan views of FIGS. 11*a*–11*c*. This is necessary because in this embodiment rotation toward the rear (counterclockwise) would move part of platform 32 under the vehicle and cause the wheelchair to interfere with the bottom of the door frame. It is also possible, by providing a longer span of linear displacement laterally of the vehicle, to give at least some clearance for rotational displacement in the rear or clockwise direction.

Lateral linear drive means 44 and rotational linear drive means 72 are reversible for moving between the stowed position and the embarkation positions of platform 32. Vertical drive mechanism 42 preferably comprises a hydraulic cylinder 48 coupleable to a hydraulic pump. The pump can be a dedicated pump driven by an electric motor using electrical power from vehicle 24. Alternatively, a vehicle with an existing hydraulic system can couple by suitable control valves to hydraulic cylinder 48 for driving vertical displacement.

In the embodiment shown in FIG. 10, hydraulic cylinder 48 is attached by welded flanges 158 to the upper or stationary one 52 of the telescoping vertical drive members. A chain 162 is fixed at one end to a point near the top of upper telescoping drive member 52 (see FIGS. 1, 3, 5 and 10) and at an opposite end to lower telescoping drive member 54 (i.e., to the platform part). Chain 162 passes around a first sprocket 164 coupled to the piston of hydraulic cylinder 48 and around a second sprocket 166 mounted in upper telescoping member 52, above the highest point to which the lower telescoping member will extend. Therefore, a given linear displacement of the hydraulic piston produces twice that displacement of lower telescoping member 54 and platform 32 thereon. The hydraulic system can be a Monarch M-250 "mini" hydraulic unit, which advantageously includes a manual jack member 168 that can be used to operate hydraulic cylinder 48 if electric power is lost.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A wheelchair lift for mounting in a doorway of a vehicle, comprising:

a platform for supporting a wheelchair;

a vertical drive mechanism attached to the platform and having powered means for raising and lowering the wheelchair relative to the doorway;

a base member attachable to the vehicle inside the doorway;

a carriage movably carried on the base member, the vertical drive mechanism being coupled to the carriage on a vertical pivot axis;

a linear drive means coupled between the carriage and the base member, the linear drive means being operable to move the vertical pivot axis through the doorway, whereupon the platform can be raised, lowered and rotated on the vertical pivot axis, for access to the platform over a range of rotational positions of the platform;

an additional linear drive means, coupled between the carriage and one of the vertical drive means and the platform, for controllable hinging Of the platform on said vertical pivot axis; and, a manually disengageable spring latch coupled between the additional linear drive means and the platform, the spring latch when disengaged permitting manual pivoting of the platform on the vertical pivot axis by decoupling of the additional linear drive means.

2. The wheelchair lift according to claim 1, wherein the platform is attached by a hinge joint to the vertical drive mechanism adjacent a bottom thereof, and wherein the platform is hingeable upwardly around the hinge joint for stowing the platform in a substantially vertical position adjacent the vertical drive mechanism.

3. The wheelchair lift according to claim 2, further comprising a latch on the vertical drive mechanism, spaced from the hinge joint, at which the platform is attachable for stowing in the vertical position.

4. The wheelchair lift according to claim 3, wherein the platform is hingeable on the vertical pivot axis when stowed in the vertical position, for clearing passage through the doorway.

5. The wheelchair lift according to claim 1, wherein the carriage is carried on the base member via a bushing slidable on a slide bar, and further comprising at least one roller spaced from the bushing and bearing between the carriage and the base member.

6. The wheelchair lift according to claim 5, wherein the slide bar is cylindrical, and further comprising means for adjusting a position of the roller, whereby the carriage is adjustable vertically around the slide bar for adjusting an alignment of the vertical drive mechanism and the vertical pivot axis.

7. The wheelchair lift according to claim 1, wherein the spring latch re-engages by manually pivoting the platform toward the additional linear drive means.

8. A wheelchair lift for mounting in a doorway of a vehicle, comprising:

a platform for supporting a wheelchair;

a vertical drive mechanism attached to the platform and having powered means for raising and lowering the wheelchair relative to the doorway;

a base member attachable to the vehicle inside the doorway;

a carriage movably carried on the base member, the vertical drive mechanism being coupled to the carriage on a vertical pivot axis;

a linear drive means coupled between the carriage and the base member, the linear drive means being operable to move the vertical pivot axis through the doorway, whereupon the platform can be raised, lowered and rotated on the vertical pivot axis, for access to the platform over a range of rotational positions of the platform;

an additional linear drive means, coupled to between the carriage and one of the vertical drive means and the platform, for controllable hinging of the platform on said vertical pivot axis;

at least one gate member disposed along an edge of the platform, having a spring biased latch operable to keep the gate member raised when the platform is not in contact with a horizontal surface, the latch having at least one contact arm operable by contact with the horizontal surface to lower the gate;

wherein the gate member is locked in a blocking position by the contact arm until the contact arm is moved clue to contact with the horizontal surface, whereby the gate member is prevented from being opened by pressure when the platform is raised; and, wherein the contact arm is pivotable on the platform and has a guide slot cooperating with a pin on the gate member, the guide slot having a first leg confining the guide pin in an opening direction of the gate member in the blocking position, and a second leg into which the guide pin passes for guiding the gate member to move in the opening direction.

9. The wheelchair lift according to claim 8, wherein at least one of the linear drive means and the additional linear drive means comprises a motor for reversibly driving a thread, and wherein the vertical drive mechanism comprises a hydraulic cylinder.

10. The wheelchair lift according to claim 8, wherein the guide slot is substantially L-shaped.

11. In combination, a vehicle having a doorway and a wheelchair lift, comprising:

a platform for supporting a wheelchair between an inside of the vehicle and a ground surface outside, the platform having a horizontal position;

a vertical drive mechanism attached to the platform at an inboard corner of the platform, having powered means for raising and lowering the wheelchair relative to the doorway, and means defining a vertical pivot axis for the platform and at least a portion of the vertical drive mechanism;

a base member attached to the vehicle inside the doorway;

a carriage movably carried on the base member, said portion of the vertical drive mechanism being coupled to the carriage for movement about the vertical pivot axis such that the vertical drive mechanism and the platform are pivotable on the vertical pivot axis, the carriage having a sufficient span to move the vertical pivot axis into and out of the doorway;

a linear drive means coupled between the carriage and the base member, the linear drive means being operable to move the vertical pivot axis through the doorway, whereupon the platform can be raised, lowered and rotated on the vertical pivot axis, for access to the platform over a range of rotational positions of the platform;

an additional linear drive means, coupled to between the carriage and one of the vertical drive means and the platform, for controllable hinging of the platform on said vertical pivot axis; and, a spring biased latch operable to couple and decouple the additional linear drive means between the carriage and the vertical drive means, the latch being manually disengageable to permit manual pivoting of the platform to clear the doorway, and re-engageable by swinging the platform back, whereupon the additional linear drive means controls rotation around the vertical pivot axis.

12. The combination of claim 11, wherein the vertical pivot axis is disposed adjacent one lateral side of the doorway, the platform and said portion of the vertical drive mechanism being rotatable around the vertical pivot axis to any point within a span of at least 90° relative to a stowed position of the platform in the vehicle.

13. The combination of claim 12, wherein the platform is attached by a hinge joint to the vertical drive mechanism adjacent a bottom thereof, and wherein the platform is hingeable upwardly around the hinge joint for stowing the platform substantially vertically in the stowed position, and further comprising a latch on the vertical drive mechanism, spaced from the hinge joint, at which the platform is attachable for stowing in the vertical position.

14. The combination of claim 13, wherein the platform is hingeable on the vertical pivot axis when stowed in the vertical position, for clearing passage through the doorway.

15. The combination of claim 11, wherein the carriage is carried on the base member via a bushing slidable on a slide bar, and further comprising at least one roller spaced from the bushing and bearing between the carriage and the base member.

16. The combination of claim 15, wherein the slide bar is cylindrical, and further comprising means for adjusting a position of the roller, whereby the carriage is adjustable vertically around the slide bar for adjusting an alignment of the vertical drive mechanism and the vertical pivot axis.

17. In combination, a vehicle having a doorway and a wheelchair lift, comprising:

a platform for supporting a wheelchair between an inside of the vehicle and a ground surface outside, the platform having a horizontal position;

a vertical drive mechanism attached to the platform at an inboard comer of the platform, having powered means for raising and lowering the wheelchair relative to the doorway, and means defining a vertical pivot axis for the platform and at least a portion of the vertical drive mechanism;

a base member attached to the vehicle inside the doorway;

a carriage movably carded on the base member, said portion of the vertical drive mechanism being coupled to the carriage for movement about the vertical pivot axis such that the vertical drive mechanism and the platform are pivotable on the vertical pivot axis, the carriage having a sufficient span to move the vertical pivot axis into and out of the doorway;

a linear drive means coupled between the carriage and the base member, the linear drive means being operable to move the vertical pivot axis through the doorway, whereupon the platform can be raised, lowered and rotated on the vertical pivot axis, for access to the platform over a range of rotational positions of the platform an additional linear drive means, coupled to between the carriage and one of the vertical drive means and the platform, for controllable hinging of the platform on said vertical pivot axis;

at least one gate member disposed along an edge of the platform, having a spring biased latch operable to keep the gate member raised when the platform is not in contact with a horizontal surface, the latch being operable by contact with the horizontal surface automatically to lower the gate;

wherein the gate member is locked in a blocking position by the contact arm until the contact arm is moved due to contact with the horizontal surface, whereby the gate member is prevented from being opened by pressure when the platform is raised; and, wherein the contact arm is pivotable on the platform and has a guide slot cooperating with a pin on the gate member, the guide slot having a first leg confining the guide pin in an opening direction of the gate member in the blocking position, and a second leg into which the guide pin passes for guiding the gate member to move in the opening direction.

18. The combination of claim 17, wherein at least one of the linear drive means and the additional linear drive means comprises a motor for reversibly driving a thread, and wherein the vertical drive mechanism comprises a hydraulic cylinder.

* * * * *

UNITED STATES PATENT AND TRADEMARK OFFICE

CERTIFICATE OF CORRECTION

PATENT NO. : 5,542,811

DATED : August 6, 1996

INVENTOR(S) : Roger Vartanian

It is certified that error appears in the above-indentified patent and that said Letters Patent is hereby corrected as shown below:

Column 11, Claim 8, line 12, delete "clue" and substitute therefor --due--.

Column 12, Claim 17, line 41, delete "carded" and substitute therefor --carried--.

Signed and Sealed this

Fifteenth Day of April, 1997

Attest:

BRUCE LEHMAN

*Attesting Officer* *Commissioner of Patents and Trademarks*